United States Patent
Kump, II

(10) Patent No.: US 11,869,101 B2
(45) Date of Patent: Jan. 9, 2024

(54) DEMAND-BASED WATER DISTRIBUTION AND MANAGEMENT SYSTEMS AND METHODS

(71) Applicant: Cyrus Kump, II, Henrico, VA (US)

(72) Inventor: Cyrus Kump, II, Henrico, VA (US)

(*) Notice: Subject to any disclaimer, the term of this patent is extended or adjusted under 35 U.S.C. 154(b) by 0 days.

(21) Appl. No.: 17/400,875

(22) Filed: Aug. 12, 2021

(65) Prior Publication Data

US 2022/0051352 A1 Feb. 17, 2022

Related U.S. Application Data

(60) Provisional application No. 63/065,261, filed on Aug. 13, 2020.

(51) Int. Cl.
*G06Q 30/0283* (2023.01)
*G06Q 50/06* (2012.01)

(52) U.S. Cl.
CPC ......... *G06Q 50/06* (2013.01); *G06Q 30/0283* (2013.01)

(58) Field of Classification Search
CPC .......................... G06Q 30/0283; G06Q 50/06
See application file for complete search history.

(56) References Cited

U.S. PATENT DOCUMENTS

| | | | |
|---|---|---|---|
| 11,282,310 B1* | 3/2022 | Charling | G07C 9/253 |
| 2011/0288899 A1* | 11/2011 | Shah | G06Q 40/12 |
| | | | 700/282 |
| 2015/0242889 A1 | 8/2015 | Zamer et al. | |
| 2016/0110808 A1* | 4/2016 | Yu | G06Q 40/04 |
| | | | 705/37 |
| 2017/0270621 A1 | 9/2017 | Fleming et al. | |

(Continued)

FOREIGN PATENT DOCUMENTS

WO 2005/026053 A2 3/2005

OTHER PUBLICATIONS

Fader, Carole; "Fact Check: E-mail adds fuel to gas pump rumor"; Mar. 14, 2011; https://www.jacksonville.com/story/news/2011/03/14/fact-check-e-mail-adds-fuel-gas-pump-rumor/15910924007/ (Year: 2011).*

(Continued)

*Primary Examiner* — Rupangini Singh
*Assistant Examiner* — David G. Godbold
(74) *Attorney, Agent, or Firm* — TROUTMAN PEPPER HAMILTON SANDERS LLP; John A. Morrissett

(57) ABSTRACT

Systems and methods for demand-based water distribution and management are disclosed. The system may determine a first price for each water distributor of a plurality of water distributors based on a plurality of demand factors. The system may transmit a plurality of water distributor locations to a first customer device, each location associated with a respective water distributor. The system may receive a selection of a first water distributor location from the first customer device and, in response, transmit directions to the first water distributor location to the first customer device. In response to the first customer device being authenticated by a first water-distribution device associated with the first water distributor, the system may transmit a signal to the first water-distribution device to transition to an unlocked state to allow the first customer to make a first purchase of water at a first price.

22 Claims, 6 Drawing Sheets

(56) References Cited

U.S. PATENT DOCUMENTS

2019/0325467 A1* 10/2019 Perry ............... G06Q 30/0605
2019/0356740 A1* 11/2019 Yuan ...................... H04W 4/38

OTHER PUBLICATIONS

Santoli, Michael; "Want to lock in today's gas prices? It's possible, but complicated"; Feb. 24, 2015; https://www.yahoo.com/entertainment/news/want-to-lock-in-today-s-gas-prices--it-s-possible--but-complicated-204044967.html (Year: 2015).*

Perez, Sarah; "Google Maps Now Lets You Add a Stop Along Your Route, Check Gas Prices"; Oct. 20, 2015; https://web.archive.org/web/20151020221050/https://techcrunch.com/2015/10/20/google-maps-now-lets-you-add-a-stop-along-your-route-check-gas-prices/ (Year: 2015).*

GigaOm; "How does Google Wallet work? Really Well!"; Dec. 7, 2011; https://web.archive.org/web/20111208184416/https://www.youtube.com/watch?v=jY2p-pNkjHA (Year: 2011).*

International Preliminary Report on Patentability in related PCT Application No. PCT/US2021/045763 dated Feb. 7, 2023 (7 pages).

International Search Report & Written Opinion dated Nov. 24, 2021 from corresponding International Application No. PCT/US2021/045763.

* cited by examiner

US 11,869,101 B2

DEMAND-BASED WATER DISTRIBUTION AND MANAGEMENT SYSTEMS AND METHODS

CROSS-REFERENCE TO RELATED APPLICATION

This application claims priority to and the benefit of U.S. Provisional Patent Application No. 63/065,261, filed Aug. 13, 2020.

FIELD OF INVENTION

Examples of the present disclosure relate to systems for demand-based water distribution and management.

BACKGROUND

Drought and water shortages are predicted to become a leading issue facing civilization. Overuse of water resources continues to deplete water resources that are free or nearly free to use for the public. With the increasing commodification of water, members of the public who have access to an excess of water may wish to provide such excess water to those who are in need of water. However, currently systems that allow a member of the public to become a water distributor able to sell his/her excess water at a demand-based price are limited or non-existent.

Accordingly, there is a need for a demand-based water distribution and management systems and accompanying methods. Examples of the present disclosure are directed to this and to other considerations.

SUMMARY

Examples of the present disclosure comprise systems and methods for demand-based water distribution and management.

Consistent with the disclosed embodiments, various methods and systems are disclosed. In an embodiment, a system performing a method for demand-based water distribution and management is disclosed. The system may determine a first price for each water distributor of a plurality of water distributors in the system, based on one or more demand factors (e.g., local demand, local supply, and a respective cost of water). The system may transmit a plurality of water distributor locations (each associated with a respective water distributor) to a first customer device. The system may receive a selection from the first customer device of a first water distribution location. In response to the selection, the system may transmit directions to the first water distributor location. When the first customer device comes into wireless communication with a first water-distribution device, the system may authenticate the first customer device. Once the first customer device is authenticated, the system may signal to the first water-distribution device to transition from a locked state to an unlocked state, allowing the first customer to purchase a quantity of water at the first price.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology. Wherever convenient, the same references numbers will be used throughout the drawings to refer to the same or like parts.

Figure 1A:
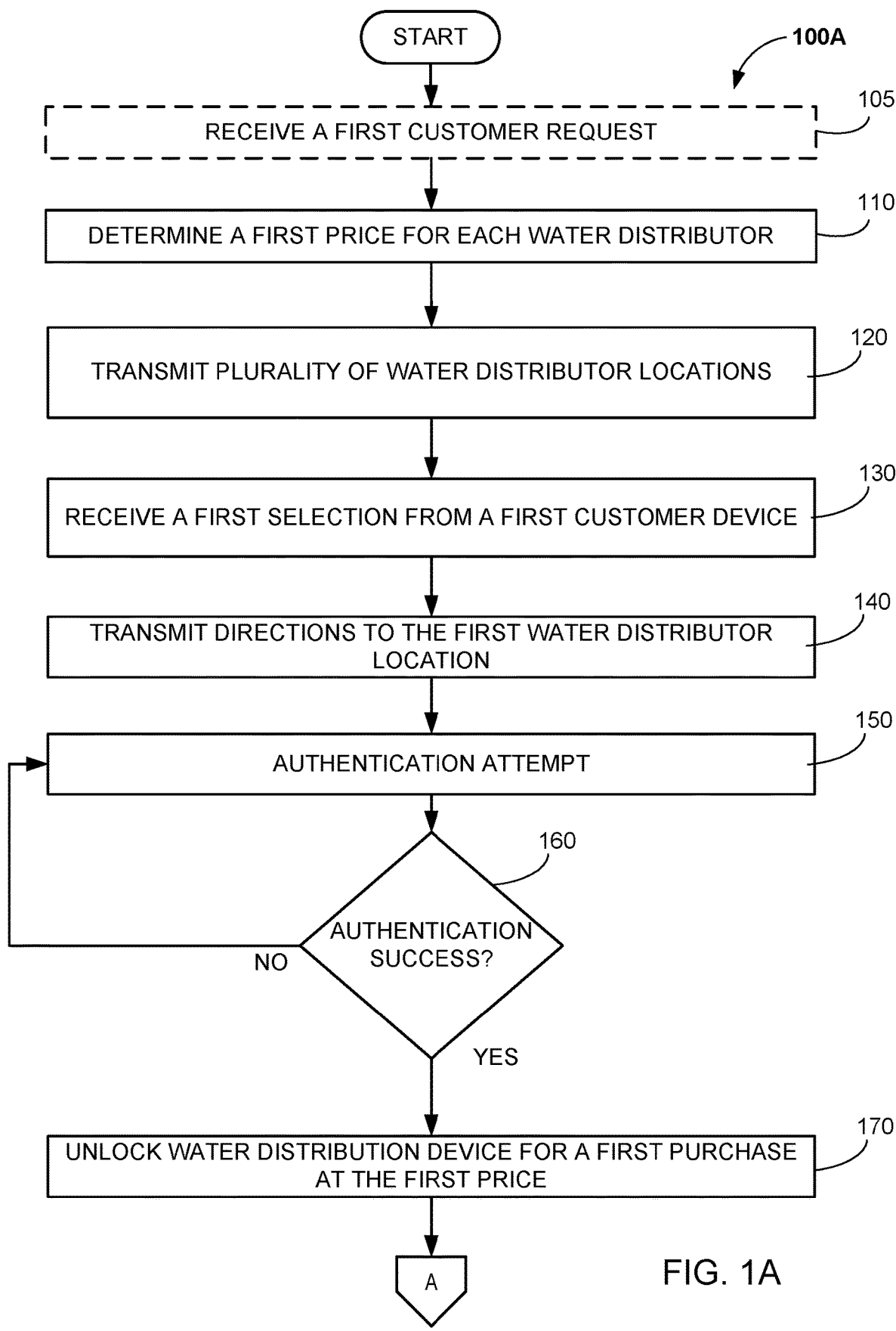
FIG. 1A is a flowchart of a method for distributing water at a first price for a first customer, in accordance with some examples of the present disclosure.

FIG. 1A is a flowchart of a method for distributing water at a first price for a first customer, in accordance with some examples of the present disclosure. Although steps in method 100A as described as being performed by the system (e.g., water allocation system 310 as described in more detail with respect to FIGS. 3-4), a person of ordinary skill in the art will understand that some or all of the steps of method 100A may be performed by a device (e.g., customer device 330 and/or water distributor device 340, as described in more detail with respect to FIGS. 3-5). Optionally, the method may include receiving a request from a first customer device (e.g., customer device 330A). For example, a first customer may use the first customer device to access an application or API that may communicate with other aspects of the system (e.g., water allocation system 310).

As shown in FIG. 1A, in optional step 105, the system may receive a first customer request from a first customer device. For example, a first customer may access an API in communication with the system (e.g., water allocation system 310, described in more detail with respect to FIG. 3) via the first customer device.

In step 110, the system may determine a first price for each respective water distributor based on a plurality of demand factors. In other words, the system may consider numerous demand factors to determine the first price. In some embodiments, the system (e.g., water allocation system 310) may determine a first price in response to the first customer request. In some embodiments, the first price for each respective water distributor may be updated in substantially real-time, with no input required from the customer. The plurality of demand factors may include the local demand. Local demand may be based on an aggregate number of requests for water distribution locations. For example, the system (e.g., water allocation system 310) may determine a density of water distribution locations requests from a plurality of customer devices (e.g., customer devices 330) over a given area. The density of water distribution location requests may be continuously monitored by aspects of the system to continuously update the calculation as a function of time. The density of water distribution location requests may be determined as a number of water distribution requests for a given area (e.g., per square mile) over a unit of time (e.g., per hour). The system may increase a given price (e.g., the first price) for a respective water distributor when, for example, the density of requests within 100 square miles has increased by 10% over the last hour. The increase in price may further be variable based on the percentage increase, such that a 20% increase in density may yield a higher price for a respective water distributor than a 10% increase would. Additionally, the system may vary the price based on a rate of increase. For example, a very sudden increase in density of requests (e.g., on the order of a few minutes) may cause the price to rise higher than a gradual increase (e.g., on the order of a few hours) of the same magnitude.

Another demand-based factor may include a local supply. The local supply may be based in part on an aggregate supply from the plurality of water distributors. The local supply may be based in part on a determined quality of water (e.g., by monitoring pH, total dissolved solids ("TDS"), and quantities of contaminants such as *E. coli*, chloramines, etc.) for every available local distributor. A local distributor may be a distributor within a predetermined distance of a geographic area of a customer. Additionally, the local supply may also be based in part on the distance between each respective local distributor and a customer utilizing the demand-based water distribution system. The aggregate supply may be based in part on the aggregate number of participating water distributors within the system. In some embodiments, the aggregate supply may be based on a predetermined volume of water that may be supplied by each participating water distributor. Depending on the infrastructure supplied by each of the participating water distributors, the predetermined volume may vary for each respective water distributor. The predetermined volume may be set by each respective water distributor when registering with the system (e.g., water allocation system 310). In some embodiments, the predetermined volume of water may be determined by the system based on one or more inputs from the water distributor (e.g., answering questions regarding the available infrastructure for delivery of water provided by the water distributor).

Another demand-based factor may include a water cost for each respective water distributor. For example, a local gas station may decide to participate in the system and become a water distributor. Using existing public infrastructure, the local gas station may have a water cost associated with providing water from the local public utility, which may charge local gas station a price for each gallon of water used by the gas station. If over the course of a month the local gas station distributes 10,000 gallons of water to customers, the water cost per month may be e.g., $100.00, depending on what is charged by the local public utility. For a water distributor using public infrastructure to deliver water to customers, the system may determine the cost by referencing one or more public databases including information regarding pricing schedules for each respective locality in which a water distributor is located. For water distributors interested in distributing a bottled water product, the system may determine the price based on an average price for the respective bottled water product in the respective locality of the respective water distributor. For example, a water distributor located in New York City may use a mobile device to scan a barcode associated with a "Dasani" water bottle that he wishes to sell using the system. The system may determine that the bottled water is a "Dasani" brand bottled water and may look up the average price associated with buying a bottle of Dasani water in New York City. The water cost may factor into the system's determination of the first price to charge a customer wishing to purchase water via the system (e.g., water allocation system 310). Further, each water distributor may utilize a device (e.g., water distributor devices 340) for monitoring the volume of water sold so that the total cost for the water distributor may be determined by the system based on the volume of water sold and the cost of providing the water to the customers. Water cost may be higher for water that is of higher quality (e.g., filtered water may have a higher cost associated with it than tap water provided by a local public utility). Accordingly, the system may charge a higher price for higher quality water. In some embodiments, each water distributor may utilize a device (e.g., water distributor devices 340) that monitors the quality of water being provided, which affects the price ultimately being charged to the customer. In some embodiments, a respective water distributor may select the quality of water they wish to provide, and the system may determine a price based in part on the provided information. The system may verify the price as described earlier (e.g., by referencing one or more public databases and/or measuring the quality of water via, e.g., water distributor devices 340) to determine whether the water quality indicated by the respective water distributor is accurate. In response to a discrepancy, the system may automatically adjust an advertised price and/or water quality level within the system.

In step 120, the system may transmit a plurality of water distributor locations to the first customer device. Each water distributor location may be associated with a respective water distributor. For example, numerous independent water distributors may access the system as providers of water as a demand-based resource to customers. In some embodiments, the water distributor locations may be transmitted to a second device (e.g., customer device 330B), a third device (e.g., customer device 330C), or any number of a plurality of customer devices (e.g., cumulatively, customer devices 330).

In step 130, the system (e.g., water allocation system 310) may receive a first selection of a first water distributor location from the first customer device. The first water distributor location may be associated with the first water distributor. For example, after receiving a plurality of water distributor locations, a customer (e.g., first customer via customer device 330A) may select a particular water distributor location based on its location, price, available volume of water, available water quality, etc. According to some embodiments, once the system (e.g., water allocation system 310) receives the selection from the first customer device, the system may generate an authentication code that uniquely identifies the first customer request. The system may transmit the authentication code to the first customer device as well as to the first water distributor associated with the first water distributor location selected by the first customer.

In step 140, the system may transmit directions to the first customer (e.g., via an electronic message sent to customer device 330A) for travel to the first water distributor location. For example, the system may provide directions in the form of an interactive map, providing the customer device with an interactive map indicating the first customer location (e.g. via a GPS signal received from customer device 330A), the water distributor location (e.g., as determined by a GPS signal from a first water distribution device 340A or from an address associated with the first water distribution device 340A), and interactive directions for navigation (e.g., presented visually as a highlighted path on the digital map and/or as a series of navigation steps). As the first customer device navigates to the first water distributor location, the interactive map may update in real time to provide the most accurate and easy to follow directions. In some embodiments, the water distributor may include customized directions for the customer (e.g., "the water canister is to the left side of the front porch"). Additionally, the water distributor may include specific hours of availability (e.g., 9:00 am to 10:00 pm, Monday-Friday) during which the water distributor's location may be available to the customer (e.g., the first customer). Outside of the stated hours of availability, the system may filter out the water distributor from the list of available water distributor locations given to the customer.

In step 150, the first customer (e.g., monitored by GPS signal via first customer device 330A) may arrive at the first water distributor location and attempt to authenticate himself/herself in order to make a purchase of water. The first customer may use the first customer device (e.g., customer device 330A) to come into wireless communication with a device (e.g., water distribution device 340A) associated with the first water distributor. The wireless communication may occur automatically once the first customer device enters a predetermined area associated with the first water distributor. In some embodiments, authentication may be initiated based on direct connections such as radio-frequency identification (RFID), near-field communication (NFC), short-range wireless communications (e.g., Bluetooth™, low-energy Bluetooth™ (BLE), WiFi™ or ZigBee™), ambient backscatter communications (ABC) protocols, USB, or local area network (LAN), or combinations thereof. The system may verify the first customer device by comparing the authentication code received from the system (e.g., water allocation system 310) to the authentication code stored on the first customer device when the first customer device initiates the authentication request with the first water distributor. For example, the device associated with the water distributor (e.g., water distribution device 340A) may receive the authentication code for the first customer device from the system (e.g., water allocation system 310) and then may compare the first customer device authentication code received as part of the authentication request with the authentication received from the system. In some embodiments, the system may verify the first customer device using one or more biometric inputs. The first customer may have pre-registered an account with the system and provided one or more biometric inputs for the system to store for authentication purposes (e.g., a fingerprint, a facial scan, an iris scan, etc.). When the first customer arrives at the water distributor location and initiates an authentication request, the system may prompt the first customer to input his or her biometric input, which may be compared to the biometric input stored by the system. If the first customer does not have a pre-registered account, the system may optionally allow the customer to create an account, verify his or her identity (e.g., using the authentication code method described above), and upload one or more biometric inputs to facilitate future purchases. According to some embodiments, authenticating the first customer may include verifying the presence of the first customer device within a predetermined local region proximate the water-distribution device. For example, the presence of the first customer device near the first water-distribution device may be verified based on the first customer device coming into wireless communication with the first water distribution device. According to some embodiments, authenticating a customer may include verifying the presence of the first customer device is within the predetermined local region proximate the water-distribution device by tracking the position of the first customer device (e.g., using a GPS signal received from the first customer device 330A, second customer device 330B, third customer device 330C, etc.).

In decision block 160, the system may determine whether the authentication attempt was successful. For example, the system may determine whether the authentication code received from the first customer device matches a stored authentication code generated in response to the first customer device making a selection of a respective water distributor. When there is match between the stored authentication code and the received authentication code beyond a predetermined threshold, the system may move to step 170. When there is no match between the stored authentication code and the received authentication code beyond a predetermined threshold such that the first customer device is not authenticated, the method may move back to step 150 to perform another authentication attempt.

In step 170, the system may transmit a signal to the first water distribution device to transition from a locked state to an unlocked state in response to the first customer device being authenticated by the first water distribution device. For example, the authentication request may be initiated as described with respect to step 150, and when the system determines that the authentication code received from the first customer device during the authentication request in step 150 is the same as the authentication code generated by the system in step 130, the first water distribution device may transition from the locked state to the unlocked state. According to some embodiments, the signal to the first water distribution device may automatically trigger a purchase of water by the first customer from the first water distribution device. In the locked state, the water distribution device may not allow a flow of water and/or access to water containers (e.g., jugs, bottles, etc.) while in the unlocked state, the water distribution device may allow water flow and/or access to water containers for delivery of water to the first customer. In some embodiments, the water distribution device may transition back to the locked state automatically in response to the first customer device exiting the predetermined area associated with the first water distributor and/or after a predetermined time period following authentication. In some embodiments, the first customer may manually lock the first water distribution device by providing an input via, e.g., the first customer device that his or her purchase is complete. The first customer may pay for the first purchase using the first customer device. For example, the first customer device may communicate with a financial service provider (e.g., financial service provider 350) with which the first customer may have a financial account, and may instruct the financial service provider to complete the payment for the first purchase. After step 170, the method may continue by determining a second price and distributing water at the second price for a second customer, in FIG. 1B.

Figure 1B:
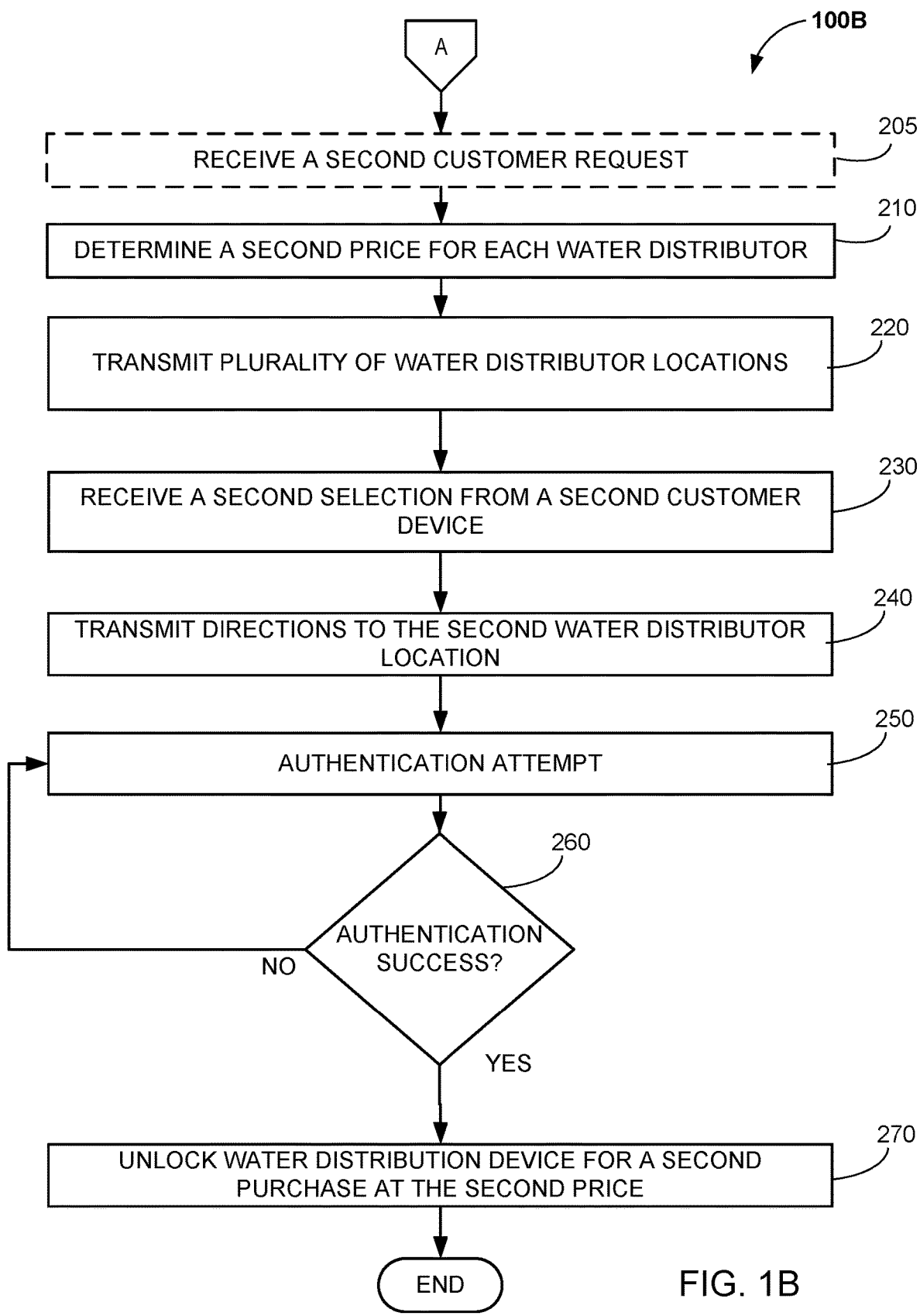
FIG. 1B is a flowchart of a method for determining a second price and distributing water at the second price to a second customer, in accordance with some examples of the present disclosure.

FIG. 1B is a flowchart of a method for determining a second price and distributing water at the second price for a second customer. Although steps in method 100B are described as being performed by the system (e.g., water allocation system 310), a person of ordinary skill in the art will understand that some or all of the steps of method 100B may be performed by a device (e.g., customer device 330A). For example, a first customer may use the first customer device to access an application or API that may communicate with other aspects of the system (e.g., water allocation system 310). Some steps of method 100B are similar to method 100A, and accordingly, a full description of such steps may be omitted for brevity. For example, steps 220, 230, 240, 250, 260, and 270 may be similar to steps 120, 130, 140, 150, 160, and 170, respectively. Accordingly, these steps may be omitted from the description for FIG. 1B as they are fully described with respect to FIG. 1A.

As shown in FIG. 1B, in optional step 205, the system may receive a second customer request from a second customer device. For example, a second customer may access an API in communication with the system (e.g., water allocation system 310) via the second customer device.

In step 210 of method 100B, the system (e.g., water allocation system 310) may determine a second price for each respective water distributor based on a plurality of demand factors. In some embodiments, the second price may be determined in response to an optional request from a second customer device, as described in step 205. The system may consider numerous demand factors to determine the first price. The plurality of demand factors may include the local demand, as described with respect to FIG. 1A. For example, the system may determine, responsive to the purchase made by the first customer with respect to method 100, that the local demand has increased based on the purchase made by the first customer. Accordingly, when a second customer attempts to purchase water in the same locality as the first customer, the system may determine a second price for each respective water distributor in the respective locality. This may be based in part on a change in the density of requests within the respective locality, as described above.

Another demand-based factor may include a local supply, as described with respect to FIG. 1A. Returning to the example above, the second price may additionally be higher based on a reduced supply in the respective locality caused by the first purchase by the first customer. Accordingly, the system may determine a higher second price for a second purchase by the second customer based on a reduction in local supply of water.

Another demand-based factor may include a water cost for each respective water distributor, as described with respect to FIG. 1A. Returning to the example above, the second price charged to the second customer for a purchase of water may be based in part on the quality of water available for purchase from the respective water distributor.

According to some embodiments, a central administrator may override a determined price (e.g., the first price, the second price, etc.) for a respective transaction. For example, the central administrator may set a ceiling price despite the system determining a price higher than the ceiling price according to the demand-based factors (e.g., local supply, local demand, water quality, etc.). In another example, the central administrator may set a floor price despite the system determining a price lower than the floor price according to the demand-based factors.

Figure 2:
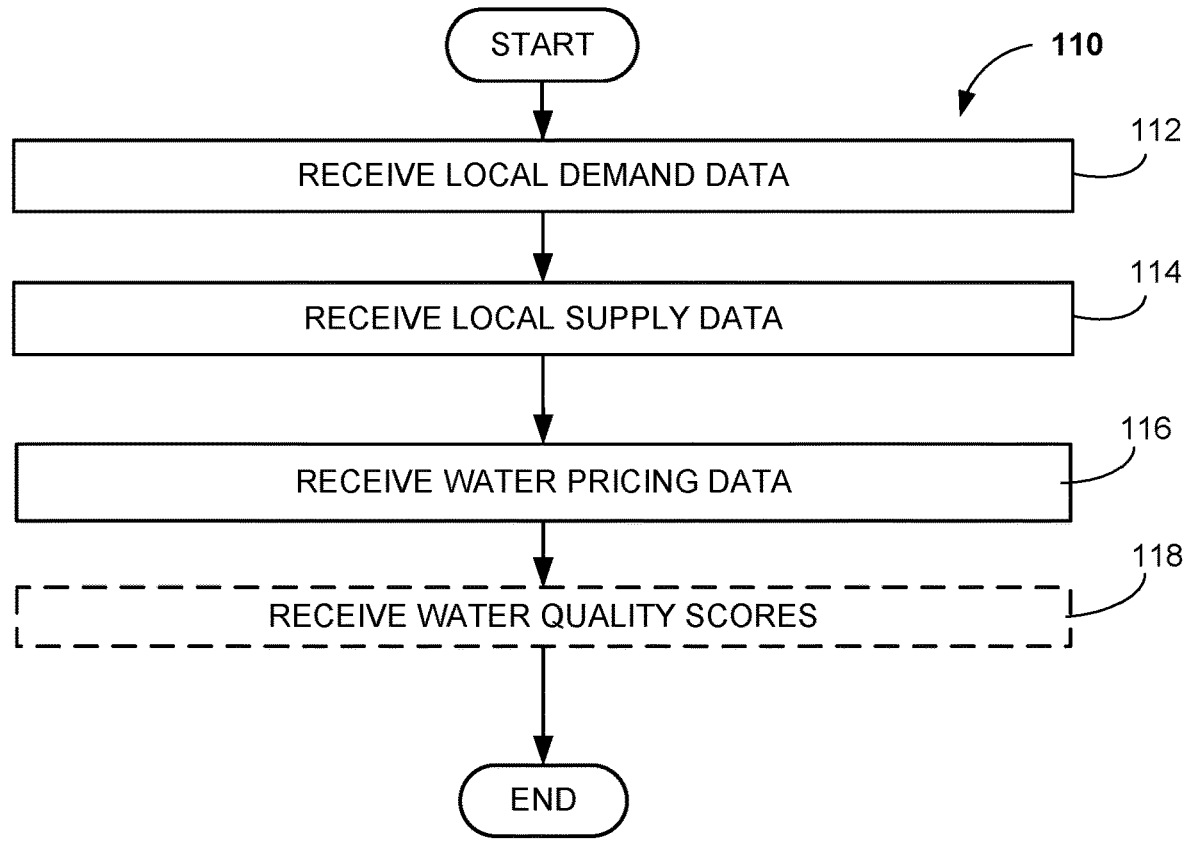
FIG. 2 is a flowchart of a method for determining a respective price for each respective water distributor, in accordance with some examples of the present disclosure.

FIG. 2 is a flowchart of a method for determining a respective price for each respective water distributor, in accordance with some examples of the present disclosure. Although steps in method 100A as described as being performed by the system (e.g., water allocation system 310 as described in more detail with respect to FIGS. 3-4), a person of ordinary skill in the art will understand that some or all of the steps of method 100A may be performed by a device (e.g., customer device 330 and/or water distributor device 340, as described in more detail with respect to FIGS. 3-5).

As shown in FIG. 2, in step 112, the system (e.g., water allocation system 310) may receive local demand data. The local demand data may be based on an aggregate demand from a plurality of customer devices within a predetermined geographic area proximate each respective water distributor. Accordingly, the local demand data may be used by the system to determine price allocation based on an aggregate demand for water within the predetermined area near each respective water distributor. For example, a higher demand in a respective area may increase the price set by the system, and a lower demand in a respective area may decrease the price set by the system.

In step 114, the system may receive local supply data. The local supply data may be based on an aggregate supply of water from a plurality of water distributors within a predetermined geographic area. Accordingly, the local supply data may be used by the system to determine price allocation based on an aggregate supply for water within the predetermined area near each respective water distributor. For example, a lower supply in a respective area may increase the price set by the system, and a higher supply in a respective area may decrease the price set by the system.

In step 116, the system may receive water pricing data. The water pricing data may include a cost of water for each respective water distributor within a predetermined area. The system may set the customer price based in part on how expensive it is for a respective water distributor to supply water to customers. For example, water prices set by the system for customers in a region with high water costs for local water distributors may be higher than prices set for customers in a different region having lower water costs, holding local supply and local demand equal between the two regions.

In optional step 118, the system may receive water quality scores from each respective water-distributor device within a predetermined area. The system may set prices based at least in part on the water quality associated with each respective water distributor. According to some embodiments, the water quality score may be determined by each water-distributor device using one or more sensors (e.g., sensors 562) that are capable of measuring various benchmarks associated with quality. For example, the water quality score may be based on measured total dissolved solids (TDS), alkalinity, pH, presence of minerals (e.g., calcium, magnesium, etc.), presence of microbes (e.g., *E. coli*), and the like.

Figure 3:
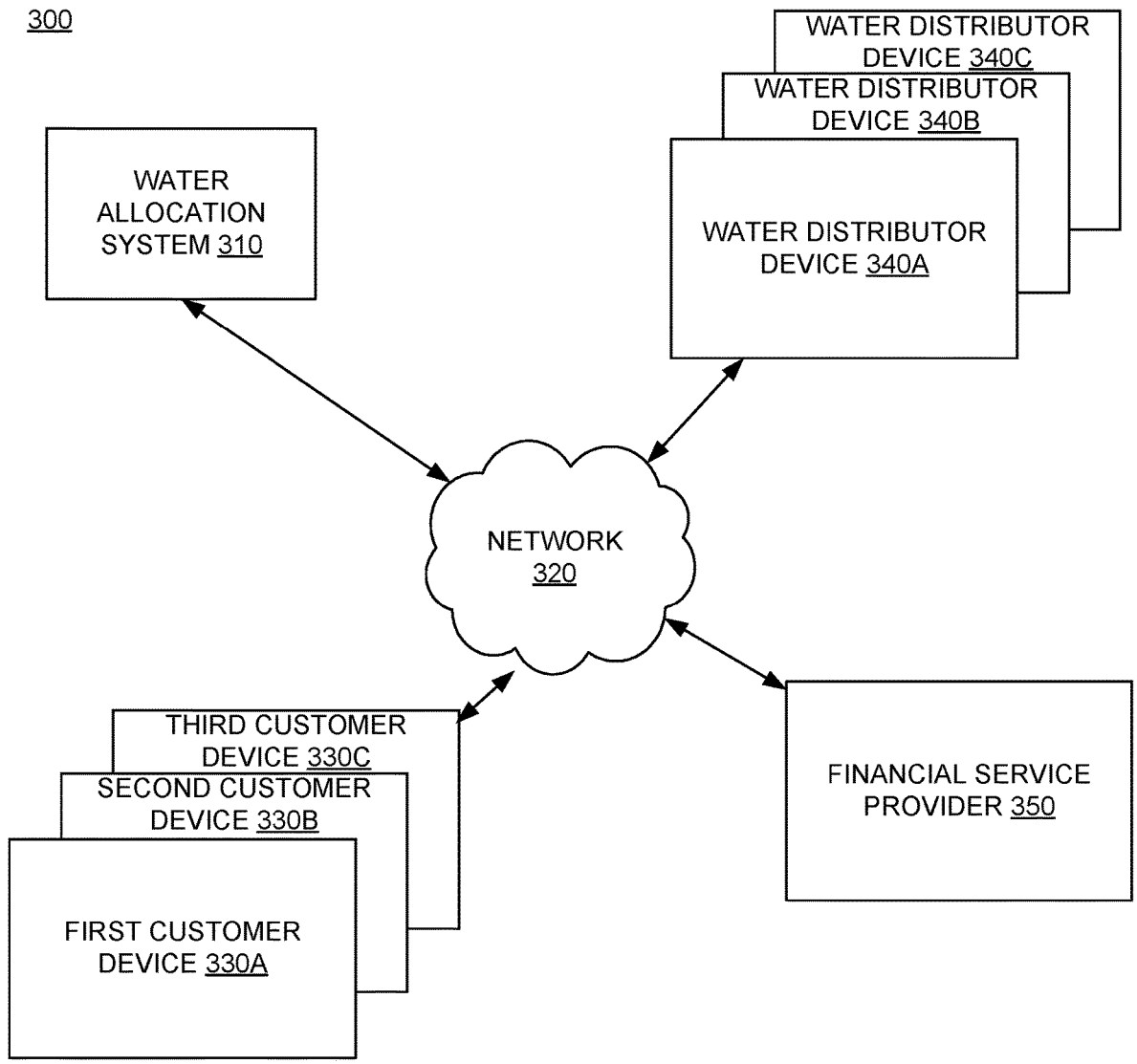
FIG. 3 illustrates an exemplary water distribution and management system consistent with disclosed embodiments.

FIG. 3 illustrates an exemplary water distribution and management system consistent with disclosed embodiments. The example system environment of FIG. 3 may be used to implement one or more embodiments of the present disclosure. The components and arrangements shown in FIG. 3 are not intended to limit the disclosed embodiments as the components used to implement the disclosed processes and features may vary.

In accordance with the disclosed embodiments, system 300 may include a water allocation system 310 in communication with a plurality of customer devices 330A, 330B, 330C, etc. (collectively customer devices 330) and one or more water distributor devices 340A, 340B, 340C, etc. (collectively water distributor devices 340). The authentication system 310 may use network 320 to communicate with the various other components of system 300, such as financial service provider 350. Customer devices 330 may be mobile computing devices (e.g., a smart phone, tablet computer, smart wearable device, portable laptop computer, voice command device, wearable augmented reality device, or other mobile computing device).

Network 320 may be of any suitable type, including individual connections via the internet such as cellular or short-range wireless communications. In some embodiments, network 320 may connect terminals using direct connections such as radio-frequency identification (RFID), near-field communication (NFC), Bluetooth™, short-range wireless communications (e.g., low-energy Bluetooth™ (BLE), WiFi™, or ZigBee™) ambient backscatter communications (ABC) protocols, universal serial bus (USB), or local area network (LAN), or combinations thereof. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 4:
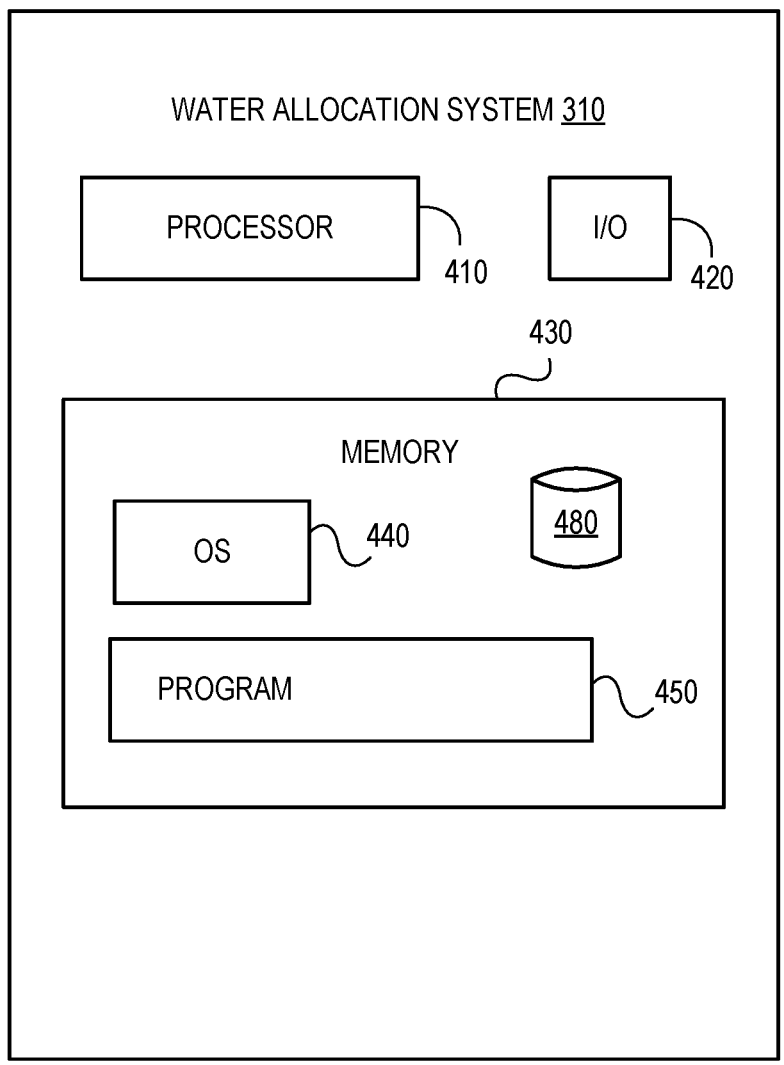
FIG. 4 is a component diagram of an exemplary water allocation system.

An example embodiment of water allocation system 310 is shown in more detail in FIG. 4. Customer devices 330 may have a similar structure and components that are similar to those described with respect to water allocation system 310. As shown, water allocation system 310 may include a processor 410, an input/output ("I/O") device 420, a memory 430 containing an operating system ("OS") 440, a program 450, and a database 480. For example, water allocation system 310 may be a single server or may be configured as a distributed computer system including multiple servers or computers that interoperate to perform one or more of the processes and functionalities associated with the disclosed embodiments. In some embodiments, water allocation system 310 may further include a peripheral interface, a transceiver, a mobile network interface in communication with processor 410, a bus configured to facilitate communication between the various components of the water allocation system 310, and a power source configured to power one or more components of water allocation system 310.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with, but not limited to, radio-frequency identification (RFID), near-field communication (NFC), short-range wireless communications (e.g., Bluetooth™, low-energy Bluetooth™ (BLE), WiFi™, ZigBee™) ambient backscatter communications (ABC) protocols Other similar technologies are also envisioned.

A mobile network interface may provide access to a cellular network, the Internet, or another wide-area network. In some embodiments, a mobile network interface may include hardware, firmware, and/or software that allows processor(s) 410 to communicate with other devices via wired or wireless networks, whether local or wide area, private or public, as known in the art. A power source may be configured to provide an appropriate alternating current (AC) or direct current (DC) to power components.

Processor 410 may include one or more of a microprocessor, microcontroller, digital signal processor, co-processor or the like or combinations thereof capable of executing stored instructions and operating upon stored data. Memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 430.

Processor 410 may be one or more known processing devices, such as a microprocessor from the Pentium™ family manufactured by Intel™ or the Turion™ family manufactured by AMD™. Processor 410 may constitute a single core or multiple core processor that executes parallel processes simultaneously. For example, processor 410 may be a single core processor that is configured with virtual processing technologies. In certain embodiments, processor 410 may use logical processors to simultaneously execute and control multiple processes. Processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Water allocation system 310 may include one or more storage devices configured to store information used by processor 410 (or other components) to perform certain functions related to the disclosed embodiments. In one example, water allocation system 310 may include memory 430 that includes instructions to enable processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, water allocation system 310 may include memory 430 that includes instructions that, when executed by processor 410, perform one or more processes consistent with the functionalities disclosed herein. Methods, systems, and articles of manufacture consistent with disclosed embodiments are not limited to separate programs or computers configured to perform dedicated tasks. For example, water allocation system 310 may include memory 430 that may include one or more programs 450 to perform one or more functions of the disclosed embodiments. Moreover, processor 410 may execute one or more programs 450 located remotely from water allocation system 310. For example, water allocation system 310 may access one or more remote programs 450, that, when executed, perform functions related to disclosed embodiments.

Memory 430 may include one or more memory devices that store data and instructions used to perform one or more features of the disclosed embodiments. Memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 430 may include software components that, when executed by processor 410, perform one or more processes consistent with the disclosed embodiments. In some embodiments, memory 430 may include an internal database 480 for storing a plurality of customer transaction data to water allocation system 310 to perform one or more of the processes and functionalities associated with the disclosed embodiments.

Water allocation system 310 may also be communicatively connected to one or more memory devices (e.g., databases (not shown)) locally or through a network. The remote memory devices may be configured to store information and may be accessed and/or managed by water allocation system 310. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Water allocation system 310 may also include one or more I/O devices 420 that may include one or more interfaces for receiving signals or input from devices and providing signals or output to one or more devices that allow data to be received and/or transmitted by water allocation system 310. For example, water allocation system 310 may include interface components, which may provide interfaces to one or more input devices, such as one or more keyboards, mouse devices, touch screens, track pads, trackballs, scroll wheels, digital cameras, microphones, sensors, and the like, that enable water allocation system 310 to receive data from one or more users (e.g., customer device(s) 330). Additionally, I/O 420 may include the audiovisual recorder utilized for receiving a feedback based on the event attended by the user.

In example embodiments of the disclosed technology, water allocation system 310 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While water allocation system 310 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of water allocation system 310 may include a greater or lesser number of components than those illustrated.

Figure 5:
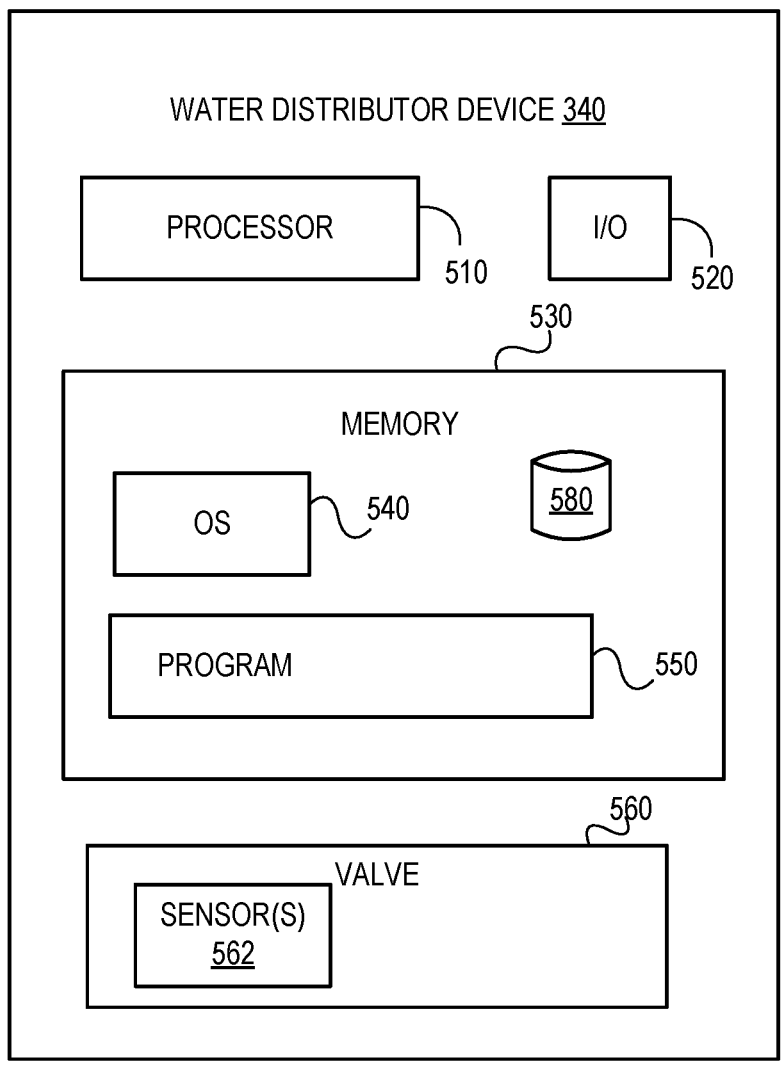
FIG. 5 is a component diagram of an exemplary water distributor device.

FIG. 5 is a component diagram of an exemplary water distributor device. Water distribution device may have many components similar to the water allocation system 310 and/or the customer device(s) 330. Accordingly, some descriptions of similar components may be omitted for brevity. For example, processor 510, I/O 520, memory 530, OS 540, program 550, and database 580 may be similar to processor 410, I/O 420, memory 430, OS 440, program 450, and database 480, and therefore descriptions of these components is omitted for brevity.

The processor (e.g., processor 510) of water distributor device 340 may be configured to operate an electrically operated valve (e.g., valve 560). Valve 560 may be attachably connected to a water supply line from a water source. In some embodiments, the water source may be a public utility water line provided by a locality. In some embodiments, the valve 560 may be placed on any water container being used by a respective water distributor to allocate water to a plurality of customers. When the valve is in a locked state, it may not allow flow of water from the water source. When the valve transitions to an unlocked state, the valve allows flow of water from the water source to allow a customer to receive purchased water from the water distributor. Additionally, valve 560 may include one or more sensors 562. The one or more sensors may include a pressure sensor capable of measuring the pressure of water flowing through valve 560. The one or more sensors may additionally include a flow sensor, which may be used to determine a volume of flow through the valve 560. Additionally, valve 560 may include a water quality sensor. The water quality sensor may be configured to measure various benchmarks associated with water quality. For example, the water quality sensor may be configured to measure total dissolved solids (TDS), alkalinity, pH, presence of minerals (e.g., calcium, magnesium, etc.), presence of microbes (e.g., *E. coli*), and the like. In some embodiments, the system (e.g., water allocation system 310) may be configured to determine the water quality for each water distributor and deny a respective water distributor access to the system when the water quality sensor determines water quality is below a predetermined threshold. The water quality predetermined threshold may include a predetermined threshold for each benchmark (e.g., *E. coli* must be present at levels below 10 parts per million).

In some embodiments, water distributor device 340 may be include a lockable cage configured for storage of jugs and/or bottles of water that a respective water distributor may wish to sell. For example, the water distributor device 340 may include a lockable cage to store jugs and/or bottles of water listed for sale by the respective water distributor. When a customer wishes to purchase a bottle or jug of water, the water distributor device 340 may transition from a locked state (in which the cage is locked and the jug and/or bottle is not accessible) to an unlocked state (allowing the customer to purchase the water bottle and/or jug) in response to authentication of the respective customer.

Examples of the present disclosure can be implemented according to at least the following clauses:

Clause 1: A demand-based water distribution and management system comprising: one or more processors; a memory in communication with the one or more processors and storing instructions that, when executed by the one or more processors, are configured to cause the system to: determine a first price for each water distributor of a plurality of water distributors based on a plurality of demand factors; transmit a plurality of water distributor locations, each associated with a respective water distributor, to a first customer device of a plurality of customer devices; receive a first selection of a first water distributor location from the first customer device, the first water distributor location associated with a first water distributor of the plurality of water distributors and a first water-distribution device of a plurality of water-distribution devices; transmit, to the first customer device, instructions comprising directions to the first water distributor location; verify a presence of the first customer device in a predetermined local region proximate the first water-distribution device by tracking, using the one or more processors, a GPS location associated with the first customer device; and responsive to the presence of the first customer device being verified, automatically transmit a signal to the first water-distribution device to transition from a locked state to an unlocked state, wherein the unlocked state allows a first customer associated with the first customer device access to water via the first water-distribution device and triggers a first purchase at the first price.

Clause 2: The system of clause 1, wherein the plurality of demand factors comprise: a local demand based on an aggregate demand from the plurality of customer devices within a predetermined geographic area proximate each respective water-distributor; a local supply based on an aggregate supply from the plurality of water distributors within the predetermined geographic area; and a water cost for each respective water distributor.

Clause 3: The system of clause 1, further configured with instructions, that when executed, are configured to cause the system to: for each respective water distributor, determine a second price responsive to a change in at least one of the plurality of demand factors based on the first purchase; transmit a plurality of water distributor locations to a second customer device; receive a second selection of a second water distributor location from the second customer device, the second water distributor location associated with a second water distributor of the plurality of water distributors and a second water-distribution device of the plurality of water-distribution devices; transmit, to the second customer device, instructions comprising directions to the second water distributor location; and responsive to the second customer device being authenticated by tracking, using the one or more processors, a GPS location associated with the second customer device, automatically transmit a signal to the second water-distribution device to transition from a locked state to an unlocked state, wherein the unlocked state allows a second customer associated with the second customer device access to water via the second water-distribution device and triggers a second purchase at the second price.

Clause 4: The system of clause 1, wherein the first water-distribution device automatically transitions from the unlocked state to the locked state responsive to the first customer device leaving the predetermined local region proximate the first water-distribution device.

Clause 5: The system of clause 1, wherein the first selection further comprises a preselection of a first amount of water for the first purchase at the first price.

Clause 6: The system of clause 1, wherein each of the plurality of water distributors further comprise: an electrically operated valve attachably connected to a supply line from a water source, the electrically operated valve having one of a plurality of sensors and being configured to allow a flow of water when the respective water-distribution device is in the unlocked state and not allow the flow of water when the respective water-distribution device is in the locked state.

Clause 7: The system of clause 6, wherein the plurality of sensors further comprise a pressure sensor, a flow sensor, a water quality sensor, or some combinations thereof and each respective water-distribution device is further configured to determine, based on one or more readings from the plurality of sensors, a total amount of water and a water quality associated with the first purchase.

Clause 8: A demand-based water distribution and management system comprising: one or more processors; a memory in communication with the one or more processors and storing instructions that, when executed by the one or more processors, are configured to cause the system to: receive local demand data associated with an aggregate demand from a plurality of customer devices within a predetermined area; receive local supply data associated with an aggregate supply from a plurality of water distributors within the predetermined area; receive, from the plurality of water distributors, water pricing data associated with each respective water distributor of the plurality of water distributors; determine a first price for each water distributor of the plurality of water distributors based on one or more factors selected from the local demand data, the local supply data, and the water pricing data; receive a first customer request from a first customer device of a plurality of customer devices; transmit a plurality of water distributor locations, each associated with a respective water distributor, to the first customer device; receive a first selection of a first water distributor location from the first customer device, the first water distributor location associated with a first water distributor of the plurality of water distributors and a first water-distribution device of a plurality of water-distribution devices; transmit, to the first customer device, instructions comprising directions to the first water distributor location; verify a presence of the first customer device in a predetermined local region proximate the first water-distribution device in response to the first customer device coming into wireless communication with the first water-distribution device; and responsive to the presence of the first customer device being verified, transmit a signal to the first water-distribution device to transition from a locked state to an unlocked state, wherein the unlocked state allows a first customer associated with the first customer device access to water via the first water-distribution device and triggers a first purchase at the first price.

Clause 9: The system of clause 8, further configured with instructions, that when executed, are configured to cause the system to: for each respective water distributor, determine a second price responsive to a change in at least one of one or more factors based on the first purchase; transmit a plurality of water distributor locations to a second customer device; receive a second selection of a second water distributor location from the second customer device, the second water distributor location associated with a second water distributor of the plurality of water distributors and a second water-distribution device of the plurality of water-distribution devices; transmit, to the second customer device, instructions comprising directions to the second water distributor location; and responsive to the second customer device being verified by coming into wireless communication with the second water-distribution device, transmit a signal to the second water-distribution device to transition from a locked state to an unlocked state, wherein the unlocked state allows a second customer associated with the second customer device access to water via the second water-distribution device and triggers a second purchase at the second price.

Clause 10: The system of clause 8, wherein the first water-distribution device automatically transitions from the unlocked state to the locked state responsive to the first customer device leaving the predetermined local region proximate the first water-distribution device.

Clause 11: The system of clause 8, wherein the first selection further comprises a preselection of a first amount of water for the first purchase at the first price.

Clause 12: The system of clause 8, wherein each of the plurality of water-distribution devices further comprise: an electrically operated valve attachably connected to a supply line from a water source, the electrically operated valve having one of a plurality of sensors and being configured to allow a flow of water when the respective water-distribution device is in the unlocked state and not allow the flow of water when the respective water-distribution device is in the locked state.

Clause 13: The system of clause 12, wherein the plurality of sensors further comprise a pressure sensor, a flow sensor, a water quality sensor, or some combinations thereof and each respective water-distribution device is further configured to determine, based on one or more readings from the plurality of sensors, a total amount of water and a water quality associated with the first purchase.

Clause 14: A method for water distribution and management, comprising: receiving, from a plurality of water distributor devices within a predetermined area, a water quality score obtained from at least one sensor of a plurality of water quality sensors each associated with a respective water distributor device of the plurality of water distributor devices, wherein each water distributor device is associated with a respective water distributor of a plurality of water distributors; determining, a first price for each water distributor based at least in part on a plurality of demand factors and the water quality score; transmitting a plurality of water distributor locations, each associated with a respective water distributor, to a first customer device of a plurality of customer devices; receiving a first selection of a first water distributor location from the first customer device, the first water distributor location associated with a first water distributor of the plurality of water distributors and a first water-distribution device of a plurality of water-distribution devices; transmitting, to the first customer device, instructions comprising directions to the first water distributor location; verifying a presence of the first customer device in a predetermined local region proximate the first water-distribution device in response to the first customer device coming into wireless communication with the first water-distribution device; and responsive to the presence of the first customer device being verified, transmitting a signal to the first water-distribution device to transition from a locked state to an unlocked state, wherein the unlocked state allows a first customer associated with the first customer device access to water via the first water-distribution device and triggers a first purchase at the first price.

Clause 15: The method of clause 14, wherein the plurality of demand factors comprises: a local demand based on an aggregate demand from the plurality of customer devices within a predetermined geographic area proximate each respective water-distributor; a local supply based on an aggregate supply from the plurality of water distributors within the predetermined geographic area; and a water cost for each respective water distributor.

Clause 16: The method of clause 14, further comprising: for each respective water distributor, determining a second price responsive to a change in at least one of the plurality of demand factors based on the first purchase; transmitting a plurality of water distributor locations to a second customer device; receiving a second selection of a second water distributor location from the second customer device, the second water distributor location associated with a second water distributor of the plurality of water distributors and a second water-distribution device of the plurality of water-distribution devices; transmitting, to the second customer device, instructions comprising directions to the second water distributor location; and responsive to the second customer device being verified by coming into wireless communication with the second water-distribution device, transmitting a signal to the second water-distribution device to transition from a locked state to an unlocked state, wherein the unlocked state allows a second customer associated with the second customer device access to water via the second water-distribution device and triggers a second purchase at the second price.

Clause 17: The method of clause 14, wherein the first water-distribution device automatically transitions from the unlocked state to the locked state responsive to the first customer device leaving the local region proximate the first water-distribution device.

Clause 18: The method of clause 14, wherein the first selection further comprises a preselection of a first amount of water for the first purchase at the first price.

Clause 19: The method of clause 14, wherein each of the plurality of water-distribution devices further comprise: an electrically operated valve attachably connected to a supply line from a water source, the electrically operated valve having one of a plurality of sensors and being configured to allow a flow of water when the respective water-distribution device is in the unlocked state and not allow the flow of water when the respective water-distribution device is in the locked state.

Clause 20: The method of clause 19, wherein the plurality of sensors further comprise a pressure sensor, a flow sensor, a water quality sensor, or some combinations thereof.

Example Use Case

The following example use case describes an exemplary use of the systems and methods for demand-based water distribution and management described herein. It is intended solely for explanatory purposes and not to limit the disclosure in any way. In one example, a customer seeking to refill his or her recreational vehicle's ("RV") water stores (e.g., during a vacation and/or road trip) may access the demand-based water distribution and management system. The customer may use a customer device to access an API in communication with one or more servers of the system (e.g., water allocation system 310). In response to an input from the customer, the system may provide to the customer device a digital map with each available water distributor within a predetermined distance of the customer device. Each available water distributor may have an associated location, distance from the respective customer, water quality rating, and price per volume of water. The distance from the respective customer may be based on the respective location of the water distributor and the customer. The water quality rating may be measured by a water distributor device associated with the respective water distributor, while in some embodiments, the distributor may manually input the water quality, although in such a case the system may either verify the water quality (e.g., with the water distribution device) or the customer may be provided with a disclaimer that the water quality has not been verified. The price per volume of water may be based on a variety of demand factors, including a local supply, a local demand, and the measured water quality. The customer may select a first water distributor and in response, the system (e.g., water allocation system 310) may provide step by step guided directions to the water distributor location. When the customer arrives at the water distributor, he or she may bring device within a predetermined distance to the water distributor device, and the device may enter wireless communication with the water distributor device. In response, the water distributor device may authenticate the customer by comparing an authentication code received from the water allocation system (e.g., water allocation system 310) with an authenticate code stored on the customer device. In response to authenticating the customer, the water distribution device may automatically transition to an unlocked state and allow the customer to begin filling his RV water stores. The water distributor device may measure the quantity of water purchased by the customer and automatically charge an account associated with the customer for the appropriate volume of water. Additionally, the water distributor device may automatically transition back to a locked state and cease flow of water when the customer device leaves a predetermined area associated with the water distributor device, allowing the system to automatically shut off the water supply when the customer has finished filling his or her stores, and further allowing the system to automatically charge the customer an appropriate price after completing the purchase.

Additionally, customers may be provided with the ability to rate each water distributor after a transaction, and to leave a customized comment. The rating may include subcategories (e.g., for water quality, price, service, convenience of the location, etc.). Similarly, water distributors may be provided the ability to rate each respective customer after a transaction with the respective customer. The ratings for each customer and/or distributor may be aggregated across all transactions associated with the customer and/or distributor to be used to maintain a real-time profile for each water distributor and each customer using the system and facilitate a positive customer experience.

The specific configurations, machines, and the size and shape of various elements can be varied according to particular design specifications or constraints requiring customer device(s) 330, financial service provider 350, water allocation system 310, water distributor device(s) 340, system 300, or methods 100 and 200 to be constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain examples and implementations of the disclosed technology are described above with reference to block and flow diagrams of systems and methods and/or computer program products according to example examples or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some examples or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, examples or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

What is claimed is:

1. A demand-based water distribution and management system comprising:
    one or more processors;
    a memory in communication with the one or more processors and storing instructions that, when executed by the one or more processors, are configured to cause the system to:
        determine a first price for each water distributor of a plurality of water distributors based on a plurality of demand factors;
        transmit a plurality of water distributor locations, each associated with a respective water distributor, to a first customer device of a plurality of customer devices;
        receive a first selection of a first water distributor location from the first customer device, the first water distributor location associated with a first water distributor of the plurality of water distributors and a first water-distribution device of a plurality of water-distribution devices;
        responsive to receiving the first selection, generate an authentication code associated with the first customer device and the first water distributor;
        transmit, to the first customer device, instructions comprising directions to the first water distributor location;
        verify a presence of the first customer device in a predetermined local region proximate the first water-distribution device by tracking, using the one or more processors, a GPS location associated with the first customer device;
        authenticate the first customer device based at least in part on the authentication code; and
        responsive to the presence of the first customer device being verified and the first customer device being authenticated, automatically transmit a signal to the first water-distribution device to transition from a locked state to an unlocked state, wherein the unlocked state allows a first customer associated with the first customer device access to water via the first water-distribution device and triggers a first purchase at the first price.

2. The system of claim 1, wherein the plurality of demand factors comprise:
   a local demand based on an aggregate demand from the plurality of customer devices within a predetermined geographic area proximate each respective water-distributor;
   a local supply based on an aggregate supply from the plurality of water distributors within the predetermined geographic area; and
   a water cost for each respective water distributor.

3. The system of claim 1, further configured with instructions, that when executed, are configured to cause the system to:
   for each respective water distributor, determine a second price responsive to a change in at least one of the plurality of demand factors based on the first purchase;
   transmit a plurality of water distributor locations to a second customer device;
   receive a second selection of a second water distributor location from the second customer device, the second water distributor location associated with a second water distributor of the plurality of water distributors and a second water-distribution device of the plurality of water-distribution devices;
   transmit, to the second customer device, instructions comprising directions to the second water distributor location; and
   responsive to the second customer device being authenticated by tracking, using the one or more processors, a GPS location associated with the second customer device, automatically transmit a signal to the second water-distribution device to transition from a locked state to an unlocked state, wherein the unlocked state allows a second customer associated with the second customer device access to water via the second water-distribution device and triggers a second purchase at the second price.

4. The system of claim 1, wherein the first water-distribution device automatically transitions from the unlocked state to the locked state responsive to the first customer device leaving the predetermined local region proximate the first water-distribution device.

5. The system of claim 1, wherein the first selection further comprises a preselection of a first amount of water for the first purchase at the first price.

6. The system of claim 1, wherein each of the plurality of water-distribution devices further comprise:
   an electrically operated valve attachably connected to a supply line from a water source, the electrically operated valve having one of a plurality of sensors and being configured to allow a flow of water when the respective water-distribution device is in the unlocked state and not allow the flow of water when the respective water-distribution device is in the locked state.

7. The system of claim 6, wherein the plurality of sensors further comprise a pressure sensor, a flow sensor, a water quality sensor, or some combinations thereof; the flow sensor is configured to determine, based on one or more readings from the plurality of sensors, a total amount of water; and the water quality sensor is configured to determine, based on the one or more readings from the plurality of sensors, a water quality associated with the first purchase.

8. A demand-based water distribution and management system comprising:
   one or more processors;
   a memory in communication with the one or more processors and storing instructions that, when executed by the one or more processors, are configured to cause the system to:
   receive local demand data associated with an aggregate demand from a plurality of customer devices within a predetermined area;
   receive local supply data associated with an aggregate supply from a plurality of water distributors within the predetermined area;
   receive, from the plurality of water distributors, water pricing data associated with each respective water distributor of the plurality of water distributors;
   determine a first price for each water distributor of the plurality of water distributors based on one or more factors selected from the local demand data, the local supply data, and the water pricing data;
   receive a first customer request from a first customer device of a plurality of customer devices;
   transmit a plurality of water distributor locations, each associated with a respective water distributor, to the first customer device;
   receive a first selection of a first water distributor location from the first customer device, the first water distributor location associated with a first water distributor of the plurality of water distributors and a first water-distribution device of a plurality of water-distribution devices;
   responsive to receiving the first selection, generate an authentication code;
   transmit the authentication code to the first customer device and the first water distributor;
   transmit, to the first customer device, instructions comprising directions to the first water distributor location;
   verify a presence of the first customer device in a predetermined local region proximate the first water-distribution device in response to the first customer device coming into wireless communication with the first water-distribution device;
   receive, from the first customer device, an authentication request comprising the authentication code;
   authenticate the first customer device based at least in part on the authentication code; and
   responsive to the presence of the first customer device being verified and the first customer device being authenticated, transmit a signal to the first water-distribution device to transition from a locked state to an unlocked state, wherein the unlocked state allows a first customer associated with the first customer device access to water via the first water-distribution device and triggers a first purchase at the first price.

9. The system of claim 8, further configured with instructions, that when executed, are configured to cause the system to:
   for each respective water distributor, determine a second price responsive to a change in at least one of one or more factors based on the first purchase;
   transmit a plurality of water distributor locations to a second customer device;
   receive a second selection of a second water distributor location from the second customer device, the second water distributor location associated with a second water distributor of the plurality of water distributors and a second water-distribution device of the plurality of water-distribution devices;

transmit, to the second customer device, instructions comprising directions to the second water distributor location; and responsive to the second customer device being verified by coming into wireless communication with the second water-distribution device, transmit a signal to the second water-distribution device to transition from a locked state to an unlocked state, wherein the unlocked state allows a second customer associated with the second customer device access to water via the second water-distribution device and triggers a second purchase at the second price.

10. The system of claim 8, wherein the first water-distribution device automatically transitions from the unlocked state to the locked state responsive to the first customer device leaving the predetermined local region proximate the first water-distribution device.

11. The system of claim 8, wherein the first selection further comprises a preselection of a first amount of water for the first purchase at the first price.

12. The system of claim 8, wherein each of the plurality of water-distribution devices further comprise:
an electrically operated valve attachably connected to a supply line from a water source, the electrically operated valve having one of a plurality of sensors and being configured to allow a flow of water when the respective water-distribution device is in the unlocked state and not allow the flow of water when the respective water-distribution device is in the locked state.

13. The system of claim 12, wherein:
the plurality of sensors further comprise a pressure sensor, a flow sensor, a water quality sensor, or some combinations thereof;
the flow sensor is configured to determine, based on one or more readings from the plurality of sensors, a total amount of water; and
the water quality sensor is configured to determine, based on the one or more readings from the plurality of sensors, a water quality associated with the first purchase.

14. A method for water distribution and management, comprising:
receiving, from a plurality of water distributor devices within a predetermined area, a water quality score obtained from at least one sensor of a plurality of water quality sensors each associated with a respective water distributor device of the plurality of water distributor devices, wherein each water distributor device is associated with a respective water distributor of a plurality of water distributors;
determining, a first price for each water distributor based at least in part on a plurality of demand factors and the water quality score;
transmitting a plurality of water distributor locations, each associated with a respective water distributor, to a first customer device of a plurality of customer devices;
receiving a first selection of a first water distributor location from the first customer device, the first water distributor location associated with a first water distributor of the plurality of water distributors and a first water-distribution device of a plurality of water-distribution devices;
transmitting, to the first customer device, instructions comprising directions to the first water distributor location;
verifying a presence of the first customer device in a predetermined local region proximate the first water-distribution device in response to the first customer device coming into wireless communication with the first water-distribution device; and responsive to the presence of the first customer device being verified, transmitting a signal to the first water-distribution device to transition from a locked state to an unlocked state, wherein the unlocked state allows a first customer associated with the first customer device access to water via the first water-distribution device and triggers a first purchase at the first price.

15. The method of claim 14, wherein the plurality of demand factors comprises:
a local demand based on an aggregate demand from the plurality of customer devices within a predetermined geographic area proximate each respective water-distributor;
a local supply based on an aggregate supply from the plurality of water distributors within the predetermined geographic area; and
a water cost for each respective water distributor.

16. The method of claim 14, further comprising:
for each respective water distributor, determining a second price responsive to a change in at least one of the plurality of demand factors based on the first purchase;
transmitting a plurality of water distributor locations to a second customer device;
receiving a second selection of a second water distributor location from the second customer device, the second water distributor location associated with a second water distributor of the plurality of water distributors and a second water-distribution device of the plurality of water-distribution devices;
transmitting, to the second customer device, instructions comprising directions to the second water distributor location; and
responsive to the second customer device being verified by coming into wireless communication with the second water-distribution device, transmitting a signal to the second water-distribution device to transition from a locked state to an unlocked state, wherein the unlocked state allows a second customer associated with the second customer device access to water via the second water-distribution device and triggers a second purchase at the second price.

17. The method of claim 14, wherein the first water-distribution device automatically transitions from the unlocked state to the locked state responsive to the first customer device leaving the local region proximate the first water-distribution device.

18. The method of claim 14, wherein the first selection further comprises a preselection of a first amount of water for the first purchase at the first price.

19. The method of claim 14, wherein each of the plurality of water-distribution devices further comprise:
an electrically operated valve attachably connected to a supply line from a water source, the electrically operated valve having one of a plurality of sensors and being configured to allow a flow of water when the respective water-distribution device is in the unlocked state and not allow the flow of water when the respective water-distribution device is in the locked state.

20. The method of claim 19, wherein the plurality of sensors further comprise a pressure sensor, a flow sensor, a water quality sensor, or some combinations thereof.

21. The system of claim 8, wherein authenticating the first customer device comprises comparing the received authentication code to a stored version of the authentication code.

22. The system of claim 8, wherein determining the first price for each water distributor is further based on a respective water quality score associated with each water distributor.

* * * * *